United States Patent [19]

Bernardy

[11] Patent Number: 5,268,936
[45] Date of Patent: Dec. 7, 1993

[54] SYNCHRONOUS DIGITAL SIGNAL TO ASYNCHRONOUS DIGITAL SIGNAL DESYNCHRONIZER

[75] Inventor: Edmond Bernardy, Brussels, Belgium
[73] Assignee: AT&T Bell Laboratories, Murray Hill, N.J.
[21] Appl. No.: 23,288
[22] Filed: Feb. 26, 1993

Related U.S. Application Data

[63] Continuation of Ser. No. 727,033, Jul. 8, 1991, abandoned.

[51] Int. Cl.$^5$ .............................................. H04L 4/04
[52] U.S. Cl. .................................. 375/118; 375/120; 370/105.3; 328/55
[58] Field of Search .............. 375/118, 120; 370/101, 370/102, 105.3; 328/55; 369/60

[56] References Cited

U.S. PATENT DOCUMENTS

| | | | |
|---|---|---|---|
| 4,791,652 | 12/1988 | McEachern et al. | 375/111 |
| 4,928,275 | 5/1990 | Moore et al. | 375/118 |
| 4,996,698 | 2/1991 | Nelson | 375/118 |
| 5,052,025 | 9/1991 | Duff et al. | 375/118 |
| 5,064,126 | 11/1991 | Moore | 370/102 |
| 5,119,406 | 6/1992 | Kramer | 375/112 |
| 5,131,013 | 7/1992 | Choi | 370/102 |

OTHER PUBLICATIONS

Contribution to T. Standard Projects, T1X1.6189-012, "Sonet Desynchronisers," Andy Reid, British Telecom, Feb. 8, 1989.
CCITT Recommendation G.707, "Synchronous Digital Hierarchy Bit Rates", Fascicle III.4—Rec. G.707, Melbourne, 1988, pp. 107-108.
CCITT Recommendation G.708, "Network Node Interface for Synchronous Digital Hierarchy" Fascicle III.4—Rec. G.708, Melbourne, 1988, pp. 109-121.
CCITT Recommendation G.709, "Synchronous Multiplexing Structure", Fascicle III.4—Rec. G.709, Melbourne, 1988, pp. 121-174.
Contribution to T1 Standards Project, dated Jul. 25, 1988, "A Synchronous Desynchronizer", Sabit Say, pp. 1-7.
"Waiting Time Jitter Reduction By Synchronizer Stuff Threshold Modulation", IEEE/IEICE Global Telecommunications Conference, Tokyo, Nov. 15, 18, 1987, W. D. Grover et al., pp. 514-518.

*Primary Examiner*—Curtis Kuntz
*Assistant Examiner*—T. Ghebretinsae
*Attorney, Agent, or Firm*—Thomas Stafford

[57] ABSTRACT

Improved jitter performance is realized in a desynchronizer for obtaining an asynchronous signal, e.g., a CEPT-4 signal, from a received synchronous signal, e.g., a SDH STM-1 signal. The improved jitter performance results from employing a unique gap generator which causes gaps in a received data signal to be spread regularly in time, and allows for almost continuous control by numerical techniques of the phase of a smooth output clock being generated. Phase control is obtained by employing a filtered version of the difference between the actual number of data bits in the received digital signal and the expected nominal number.

11 Claims, 3 Drawing Sheets

SYNCHRONOUS DIGITAL SIGNAL TO ASYNCHRONOUS DIGITAL SIGNAL DESYNCHRONIZER

This application is a continuation of application Ser. No. 07/727,033, filed on Jul. 8, 1991, abandoned.

TECHNICAL FIELD

This invention relates to digital transmission systems and, more particularly, to converting synchronous digital signals to asynchronous digital signals.

BACKGROUND OF THE INVENTION

Prior desynchronizer techniques and arrangements for converting synchronous digital transmission signals to asynchronous digital transmission signals are known. In recent digital transmission systems it has become important to smooth large gaps in a supplied data signal resulting from overhead bit and stuff bit removal. This is particularly important, for example, in converting a Synchronous Digital Hierarchy (SDH) STM-1 155.520 Mb/s synchronous digital signal to a CEPT-4 139.264 Mb/s asynchronous digital signal.

As is known, overhead bit removal from the SDH STM-1 signal results in relatively high jitter components. Additionally, it is also known that so-called pointer adjustments are used to reconcile phase and frequency differences between a clock signal derived from an incoming STM-1 signal and a local clock signal. These pointer adjustments are made on a byte-wise basis and can be either positive or negative. For example, for the CEPT-4 application, three bytes are used for the pointer adjustments, i.e., for stuffing, while for the DS3 application one byte is employed. During normal system operation, the pointer adjustments occur relatively infrequently. This causes a low frequency, relatively large peak-to-peak jitter component in the derived clock. When the system operation is degraded, pointer adjustments may occur more often. Thus, a wide range of pointer adjustment rates is possible.

A so-called bit leaking technique in conjunction with a phase locked loop and a desynchronizing elastic store has been proposed in an attempt at smoothing gaps in a derived clock caused by the pointer adjustments in a SDH signal format. A bit leak is defined as one (1) bit of phase error being supplied to a phase locked loop. One of these techniques employs a bit-by-bit leaking adjustment so that a phase locked loop having a "wider" bandwidth may be employed in the desynchronizer. This bit-by-bit technique, however, does not adequately compensate for the full range of pointer adjustment rates which may occur. Attempts at compensating for the pointer adjustments employing adaptive bit leaking arrangements have also been proposed. However, to the best of my knowledge the proposed adaptive bit leaking arrangements still cause excessive low frequency jitter to occur in the asynchronous digital signal, e.g., the CEPT-4 signal, or just simply do not operate satisfactorily.

SUMMARY OF THE INVENTION

The problems associated with prior known desynchronizer arrangements are overcome, in accordance with the invention, by employing a unique gap generator arrangement which causes gaps in a received data signal to be spread regularly in time and, in conjunction with an arrangement for numerically controlling phase, allows for an almost continuous control of the phase of a smooth output clock being generated.

More specifically, the gap generator yields a "smooth" gapped output clock having a mean frequency related to the ratio of the asynchronous digital signal clock frequency to the synchronous digital signal clock frequency. The distribution of the gaps in the gapped output clock is regular in time, and is independent of the distribution of the gaps resulting from overhead bit removal. The jitter resulting from the overhead bit removal, known as "mapping jitter", is thereby eliminated.

In an embodiment of the invention, the exact instantaneous phase error of a received synchronous digital signal is continuously monitored and used to automatically generate a smooth output clock. The instantaneous phase error is representative of the difference between the actual number and nominal number of payload data bits of the received digital signal and is available in numerical form. Numerical techniques are advantageously employed to control phase of the output clock. This numerical control provides a well defined and readily predictable response of the desynchronizer to the irregularities in the received signal bit rate caused by the justification bits or by the pointer adjustments.

DETAILED DESCRIPTION

Figure 1:
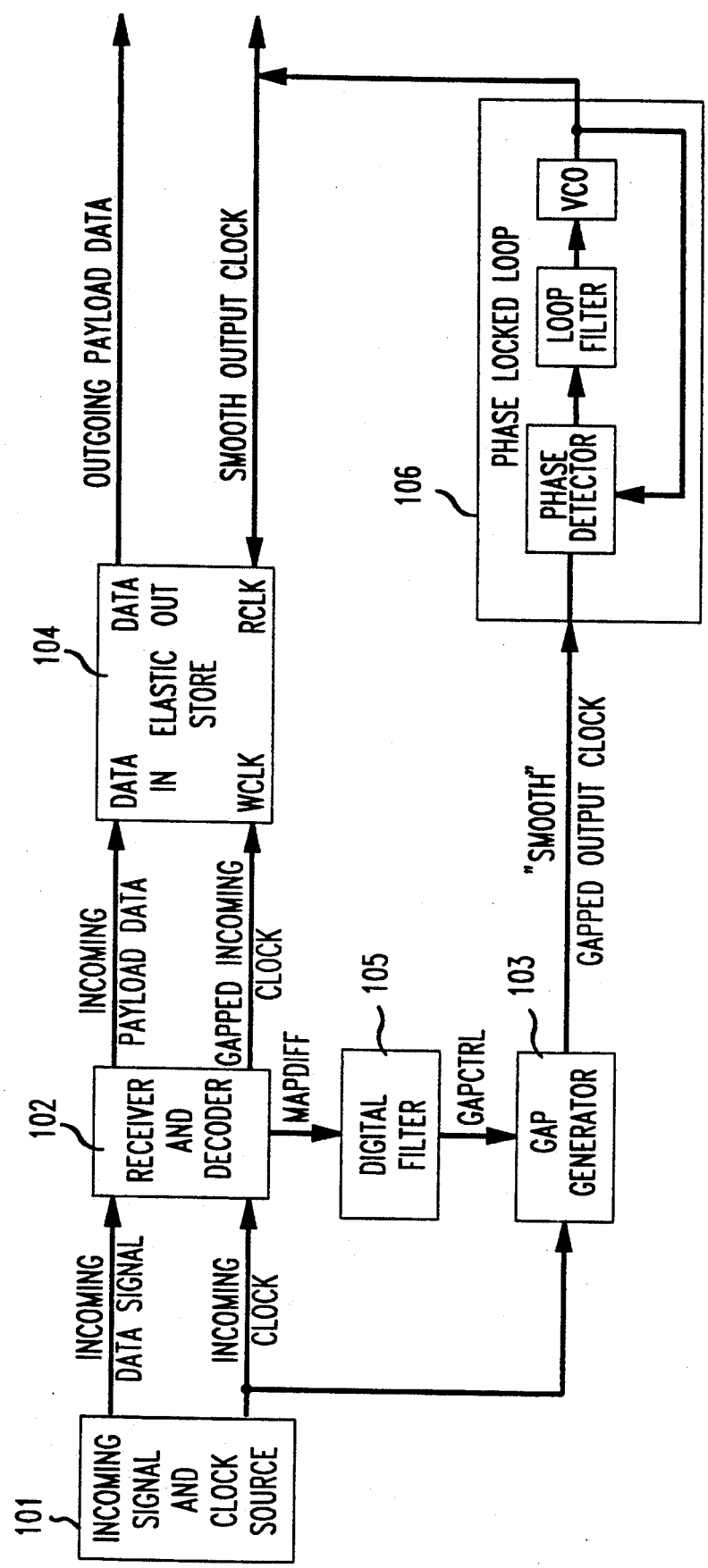
FIG. 1 shows, in simplified block diagram form, a desynchronizer including an embodiment of the invention for converting a synchronous digital signal to an asynchronous digital signal.

Shown in the FIG. 1 is incoming signal and clock source 101 which supplies as outputs an incoming synchronous digital signal and its associated clock. In one example, the incoming digital signal is the STM-1 Synchronous Digital Hierarchy (SDH) signal and the incoming clock is the STM-1 clock of 155.520 MHz. Details of the STM-1 SDH signal format are described in CCITT Recommendation G.707, G.708 and G.709 entitled "Synchronous Digital Hierarchy Bit Rates", "Network Node Interface For The Synchronous Digital Hierarchy" and Synchronous Multiplexing Structure", respectively. The mapping of the 139.264 Mb/s CEPT-4 digital signal into an SDH signal format is specified in the above noted CCITT Recommendation G.709, section 5.1.1.

The incoming STM-1 data signal and its associated STM-1 clock are supplied to receiver and decoder 102. The STM-1 clock is also supplied to gap generator 103. Receiver and decoder 102 is employed, in this example, to convert the STM-1 data signal into a gapped CEPT-4 digital data signal and to convert the STM-1 clock into a gapped incoming clock. The gapped data signal denoted "incoming payload data" is written into elastic store 104 at the gapped incoming clock rate. As is known, the gapped incoming clock only has clock pulses at the positions in the signal format corresponding to data bits since the overhead bits and stuffing bits have been removed. As indicated in CCITT Recommendation G.709 "payload data" is the data carried in the payload envelope portion of the incoming STM-1 signal. As explained below, the output payload data is read from elastic store 104 at the smooth output clock rate. In this example, the nominal smooth output clock rate is 139.264 MHz.

Gap generator 103 is supplied with the incoming signal clock and is responsive to GAPCTRL from digital filter 105 to generate a "smooth" gapped output clock. The smooth gapped output clock is supplied to phase locked loop (PLL) 106 which, in turn, yields the desired smooth output clock. In the CEPT-4 application, phase locked loop 106 is an analog PLL which is needed to filter the residual high frequency jitter of the smooth output gapped clock and to filter the jitter of the incoming STM-1 clock. In other applications, for example, for a DS1 digital signal, use of an analog phase locked loop may not be necessary. The smooth output clock from phase locked loop 106 is supplied to a read clock input of elastic store 104 and as an output from the desynchronizer unit.

Gap generator 103 operates by keeping track of the instantaneous phase difference between the output clock actually being generated and an ideal, smooth target output clock.

Let the ratio of the nominal smooth output clock to the incoming clock be $$\frac{N-K}{N},$$

where N and K are relative prime numbers. Then, under nominal conditions the phase of the desired smooth output clock should increase by $$\frac{N-K}{N}$$

cycles for every cycle of the incoming clock. An incoming clock pulse is either passed through or blocked by gap generator 103. If an incoming clock pulse is passed through, the output phase increases by one (1) cycle and, thus, introduces a phase error of $$+\frac{K}{N}$$

cycles, while a blocked pulse (=gap) creates a phase error of $$-1+\frac{K}{N}$$

cycles.

In the STM-1/CEPT-4 example, the incoming STM-1 clock is 155.520 MHz and the desired smooth output CEPT-4 clock is 139.264 MHz. Thus, the ratio is $$\frac{139264}{155520} = \frac{1088}{1215} = \frac{1215-127}{1215}$$

and, therefore, N=1215, K=127. Accordingly, under "normal" conditions the desired smooth gapped output clock generated by gap generator 103 should have 1088 cycles for 1215 cycles of the incoming clock. Consequently, K=127 gaps must be generated for each N=1215 cycles of the incoming clock.

In order to spread the gaps regularly in time gap generator 103 keeps track of the instantaneous phase difference, called PH_ERR hereafter, between the generated output clock and the ideal target output clock, and produces pulses or gaps in the generated output clock according to the value of the phase error. PH_ERR is computed in units of 1/N cycle, ensuring that the accumulated phase error is tracked without roundoff error.

Figure 3:
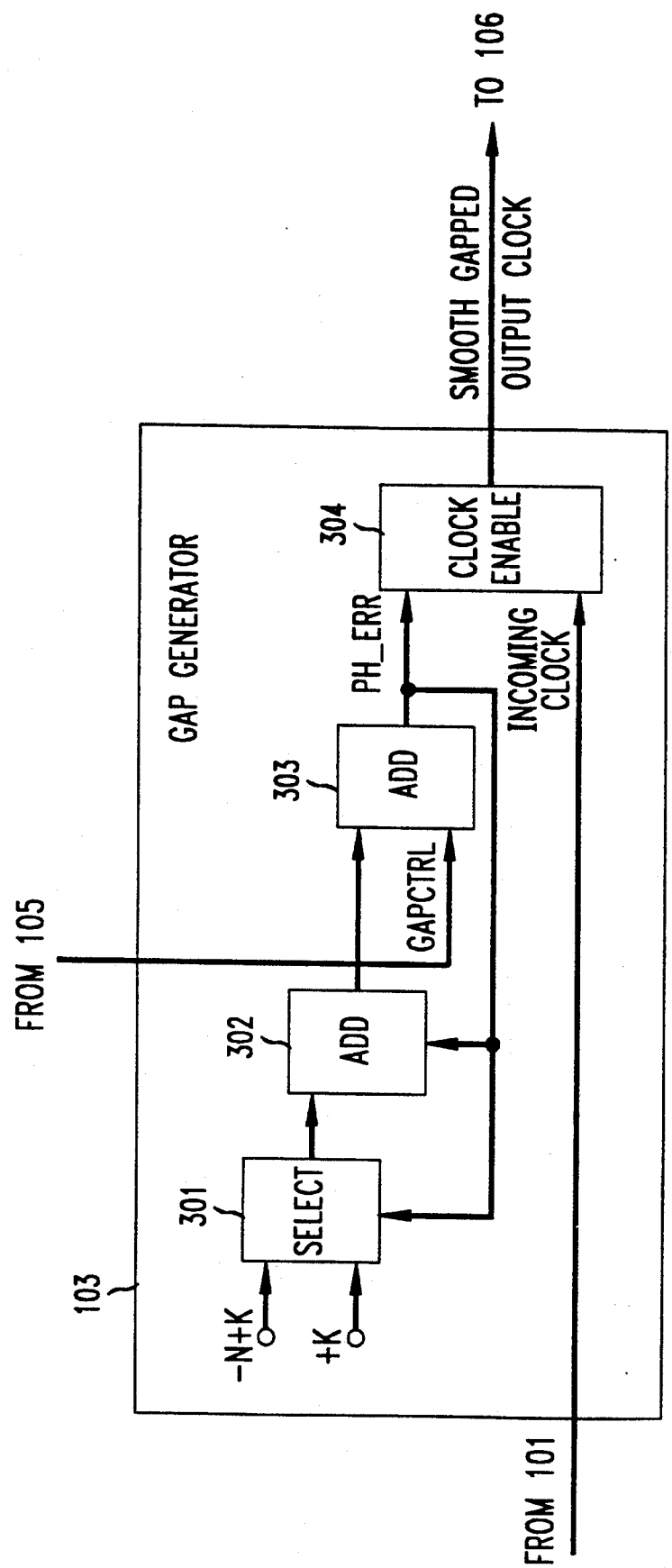
FIG. 3 shows, in simplified block diagram form, details of the gap generator of FIG. 1.

FIG. 3 shows, in simplied form, details of gap generator 103. Specifically shown are select 301, adder 302, adder 303 and clock enable 304. Select 201 is responsive to PH_ERR to supplied either −N+K or K to adder 302. If PH−ERR is positive or zero, −N+K is selected via 301 and added via 302 to PH_ERR, thereby decrementing it by N−K. If PH_ERR is negative, K is selected via 301 and added via 302 to PH_ERR, thereby incrementing it. GAPCTRL from digital filter 105 is added via 303 to the output of adder 302 yielding PH_ERR which, in turn, is supplied to clock enable 304, select 301 and adder 302. When PH_ERR is positive or zero, clock enable is disabled from supplying the incoming clock as an output to yield the smooth gapped output clock. Otherwise, clock enable 304 is enabled to supply the incoming clock as an output to yield the smooth gapped output clock.

The operation of gap generator 103 can be described as follows:

--- reset PH_ERR to zero;

for each input clock cycle do:
    if PH_ERR is positive or zero then

{disable output clock pulse; (→ generate gap)

decrement PH_ERR by N-K}
    else

{enable output clock pulse; (→ generate pulse)

increment PH_ERR by K}

---

The process described above provides a gapped output clock having a phase value that tracks as closely as possible the phase of the ideal continuous target clock. The process also provides a means to control the phase of the generated clock with a very high resolution. Changing the value of PH_ERR changes the phase of the target clock, and thereby the phase of the generated output clock. PH_ERR accumulates the phase error in units of 1/N cycle. Adding the value of GAPCTRL produced by digital filter 105 to PH_ERR changes the phase of the ideal target clock by GAPCTRL/N cycles. It is noted that the value of GAPCTRL can be either positive or negative and, therefore, will provide either a delay or advance, respectively, of the generated clock.

The basic gap generating procedure described above can be modified to obtain a lower repetition rate of the required arithmetic operations. In the CEPT-4 example the ratio of present clock pulses to gaps is 1088/127=8.567. The phase error can therefore be computed every 8 incoming clock cycles instead of each clock cycle, and a one cycle gap created when necessary, namely:

--- if PH_ERR is positive or zero then

{disable output clock pulse; (→ generate gap)

decrement PH_ERR by N-8K (199)} else

{enable output clock pulse; (→ generate pulse)

increment PH-ERR by 8K (1016)}

---

The phase of the generated output clock can again be adjusted by adding the value of GAPCTRL from digital filter 105 to PH_ERR.

The above gap generating procedure is readily realized in gap generator 103 of FIG. 3 by supplying $-N+8K$ and $8K$ as the inputs to select 302.

Although the above embodiment of the invention can be employed in many applications, it may be advantageous to employ a slightly different arrangement for applications in which the data rate is much lower than the incoming signal clock rate. One example, is a desynchronizer for recovering a DS1 digital signal from a STS-1 SONET signal. As is known, the STS-1 clock is 51.840 MHz and the DS1 rate is 1.544 Mb/sec. Thus, in this example, $$\frac{N-K}{N} = \frac{1544}{51840} = \frac{193}{6480} = \frac{6480 - 6287}{6480}.$$

The embodiment of the invention described above generates a clock pulse after either 32 or 33 gaps. A group of 32 gaps and one clock pulse yields a phase error of $+111$, while a group of 33 gaps and one clock pulse yields a phase error of $-82$. The phase error is again computed in units of $1/N$ or in this example, $1/6480$ cycle. The desired sequence can be generated by a counter which is controllably programmed to divide the incoming clock by either a divisor value of 33 or a divisor value of 34 using the following:

---

INITIALIZE: PH_ERR = 0

BEGIN:    wait for divide to complete
              if PH-ERR > 0 then
              divide = 34
              PH_ERR = PH_ERR-82
    else
              divide = 33
              PH_ERR = PH_ERR + 111
    goto
BEGIN

---

This procedure constrains the length of the output clock period to be either 33 or 34 cycles of the incoming clock, and phase locked loop 106 will not be needed in most such applications.

The phase of the generated output clock can again be adjusted by adding the value of GAPCTRL from digital filter 105 to PH_ERR.

The primary purpose of digital filter 105 is to provide smoothing of the phase variations of the incoming clock caused by pointer adjustments or justification bits. A secondary function of digital filter 105 is to provide control of the filling and "centering" of elastic store 104. Accordingly, FIG. 2 shows, in simplified form, a functional diagram of digital filter 105.

Receiver and decoder 102 generates at regular time intervals T a number denoted MAPDIFF. MAPDIFF is representative of the difference between the actual number of data bits received in interval T and the expected nominal number of bits. Interval T can be, for example, the STM-1 frame interval (125 μs), i.e., a fixed portion of the received digital signal. MAPDIFF is readily obtained by counting the actual incoming data bits and comparing the result to the expected nominal number of data bits per frame. Under nominal conditions, each STM-1 frame includes a fixed predetermined number of data bits. For a CEPT-4 application, each STM-1 frame nominally includes 17,408 CEPT-4 data bits. Because of bit justifications and pointer adjustments, the actual number of data bits differs from the nominal number, the difference being the computed MAPDIFF.

Figure 2:
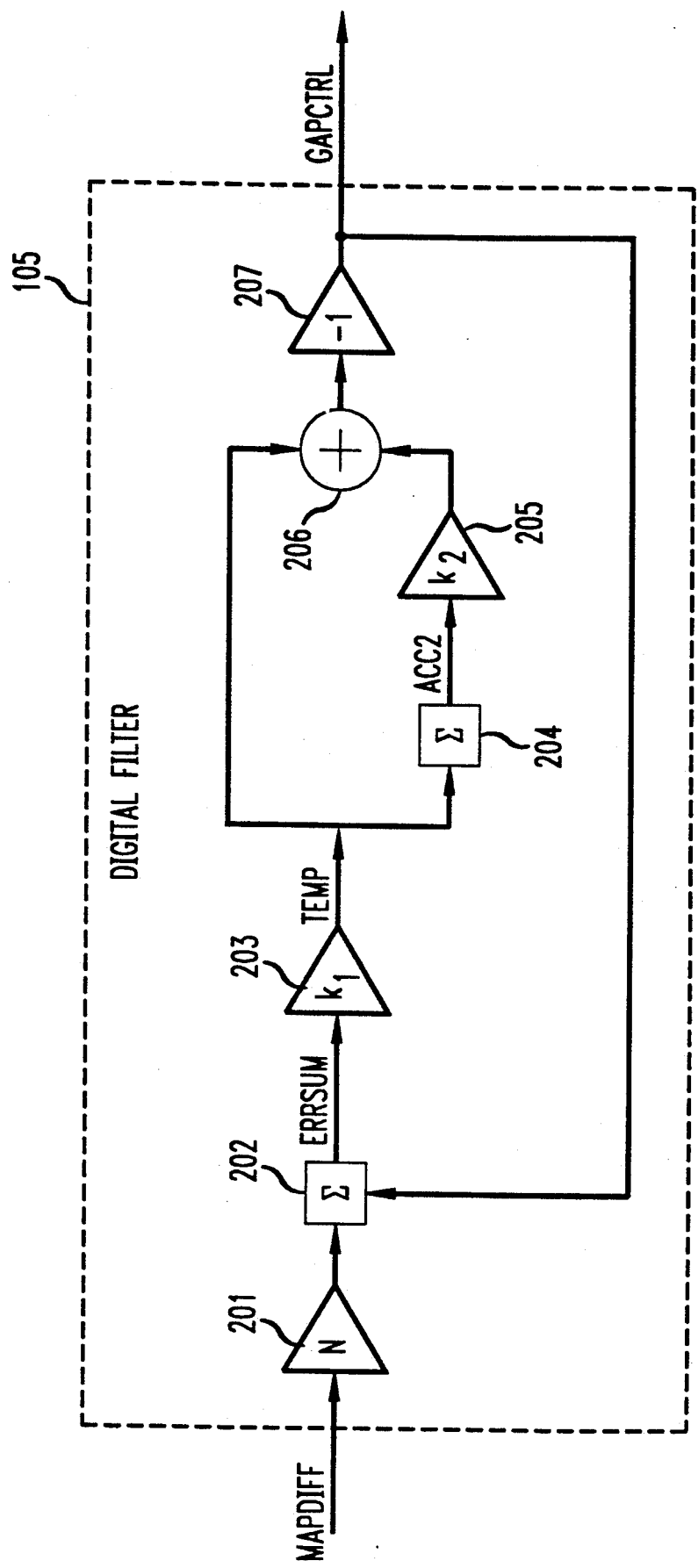
FIG. 2 shows in simplified form, a function diagram of the digital filter employed in the embodiment of FIG. 1.

As shown in FIG. 2, the MAPDIFF value from receiver and decoder 102 FIG. 1 is multiplied via 201 by the constant factor N, in this example N=1215, and the result is added in accumulator 202 to ERRSUM. ERRSUM is multipled by constant $k_1$ via 203 to obtain TEMP which is supplied to one input of adder 206. TEMP is also supplied to accumulator 204 and added to ACC2. In turn, ACC2 is multiplied by constant $k_2$ via 205 and the result is supplied to another input of adder 206. The output of adder 206 is inverted via 207 to yield GAPCTRL. In turn, GAPCTRL is supplied to accumulator 202 and added to ERRSUM. It is noted that because of the sign reversal in digital filter 105, ERRSUM equals the difference between the phase of the write and read clocks supplied to elastic store 104, i.e., the filling of elastic store 104, in units of 1/N bits. Both N*MAPDIFF and GAPCTRL are integer numbers and their sum ERRSUM is computed without roundoff error.

The sequence of operations performed by digital filter 105 can be described as follows:
ERRSUM = ERRSUM + N*MAPDIFF
TEMP = $k_1$*ERRSUM
ACC2 = ACC2 + TEMP
GAPCTRL = $-$(TEMP+$k_2$*ACC2)
ERRSUM = ERRSUM + GAPCTRL The system function of digital filter 105, in this example, is a low pass function and is as follows, $$H(z) = -Nz \frac{k_1(1+k_2)z - k_1}{(z-1)^2 + k_1(1+k_2)z - k_1}.$$

The corresponding Laplace transform for the low frequency response is $$H(s) = -N \frac{2\zeta\omega_0 s + \omega_0^2}{s^2 + 2\zeta\omega_0 s + \omega_0^2},$$

with $$\omega_0 = \frac{\sqrt{k_1 k_2}}{T}, \zeta = \frac{1+k_2}{2}\sqrt{\frac{k_1}{k_2}},$$

which is the response of a standard high gain second order phase locked loop. The dynamic response of the digital filter is thereby completely defined. It is basically a low-pass filter with a 3 dB cut-off frequency $$f_{3\,dB} \approx \frac{k_1}{2\pi T}.$$

The bandwidth of the filter is chosen to meet the output jitter requirements.

As is known from phase locked loop theory, the second order phase locked loop provides zero phase error for a constant frequency error input. In the present application this property provides centering of the elastic store for regularly recurring pointer adjustments, i.e., degraded mode.

In order to simplify the arithmetic operations, interger powers of 2 can generally be chosen for filter coefficients $k_1$ and $k_2$. For example, employing $k_1=2^{-10}$ and $k_2=2^{-16}$ with a sampling period T of 125 µs yields a filter 3dB bandwidth of 1.26 Hz and a damping factor of 4, which are suitable for the STM-1/CEPT-4 application.

I claim:

1. An apparatus for desynchronizing an incoming digital signal at an incoming digital clock rate to obtain an outgoing digital signal at an output digital clock rate different from the incoming digital clock rate, the apparatus comprising:
a source of an incoming digital signal and an associated incoming clock;
means for obtaining a gapped data signal from said incoming digital signal;
means for obtaining a gapped incoming clock from said incoming clock;
means for generating a control signal including means for generating a representation of the difference between an actual number and a nominal expected number of payload data bits in a predetermined portion of said incoming digital signal;
means supplied with said incoming clock and being responsive to said control signal for generating an output clock including means for controllably enabling and disabling generation of an output clock pulse in response to a phase error value of said output clock, generation of an output clock pulse being disabled for first prescribed values of said phase error and being enabled otherwise, means for decrementing said phase error value by a first predetermined value upon disabling generation of an output clock pulse and means for incrementing said phase error value by a second predetermined value upon enabling generation of an output clock pulse; and
elastic store means supplied with said gapped data signal, said gapped incoming clock, and said output clock for supplying as an output a smooth outgoing data signal at said output clock rate.

2. The apparatus as defined in claim 1 wherein said means for generating said control signal further includes low pass filter means for obtaining a filtered version of said difference representation, said filtered version being said control signal.

3. The apparatus as defined in claim 2 wherein said control signal is a numerical representation of said filtered version of said difference representation.

4. The apparatus as defined in claim 3 wherein said means for generating said output clock includes means responsive to said numerical representation and to said incoming clock for generating a gapped output clock.

5. The apparatus as defined in claim 4 wherein said means for generating said output clock further includes a phase locked loop supplied with said gapped output clock.

6. The apparatus as defined in claim 5 wherein said phase locked loop is an analog phase locked loop.

7. The apparatus as defined in claim 4 wherein said means for generating said gapped output clock includes means for controllably adjusting a phase error value of said generated gapped output clock by algebraically adding said numerical representation to said phase error value.

8. The apparatus as defined in claim 1 wherein said means for generating said output clock is responsive to each clock pulse of said incoming clock, said first predetermined value is N−K and said second predetermined value is K, wherein N is a prime integer representative of the incoming clock rate and K is a prime integer representative of a difference between the incoming clock rate and the output clock rate.

9. The apparatus as defined in claim 8 wherein said means for generating said output clock further includes means for controllably adjusting said phase error value by algebraically adding a value of said control signal to said phase error value.

10. The apparatus as defined in claim 1 wherein said means for generating said output clock is operative to evaluate said phase error value in response to every Xth clock pulse of said incoming clock, said first predetermined value is N−XK and the second predetermined value is XK, where N is of a prime integer representative of a difference between the incoming clock rate and the output clock rate and X is an integer multiple of K.

11. The apparatus as defined in claim 10 wherein said means for generating said output clock further includes means for controllably adjusting said phase error value by algebraically adding a value of said control signal to said phase error value.

* * * * *